Oct. 8, 1963     L. N. LEA     3,106,024
LEVELING DEVICES
Filed Nov. 18, 1960     3 Sheets-Sheet 1
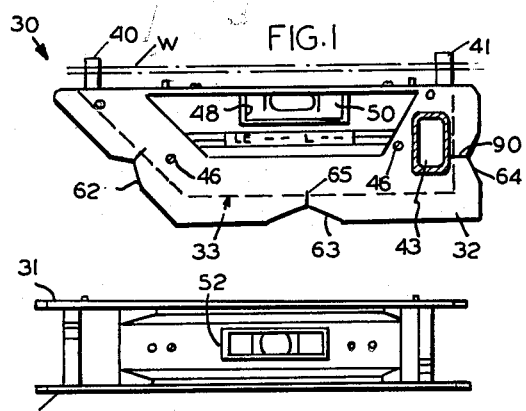
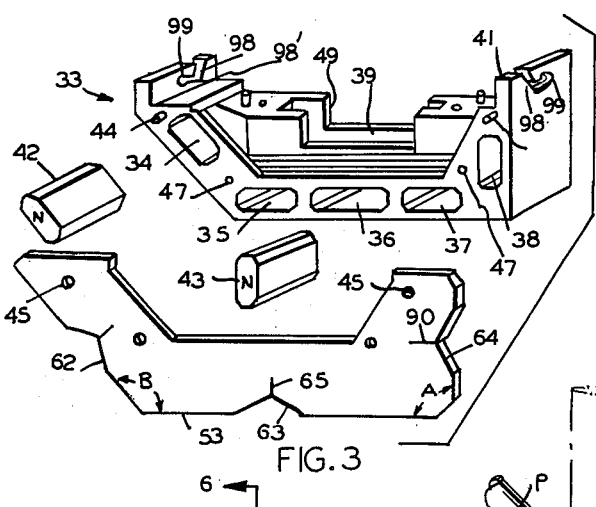
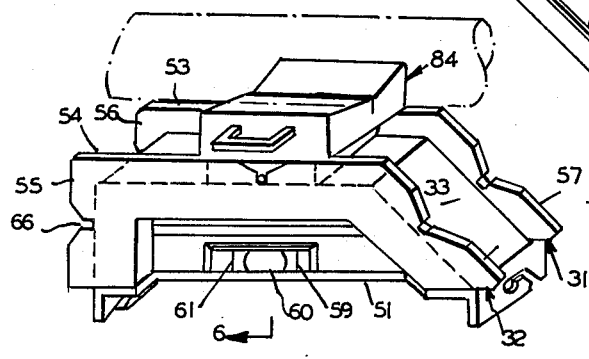
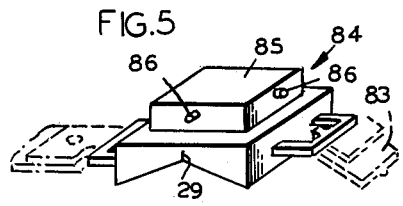
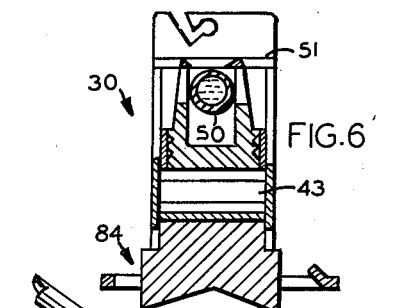
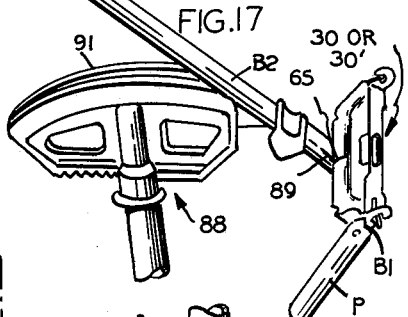
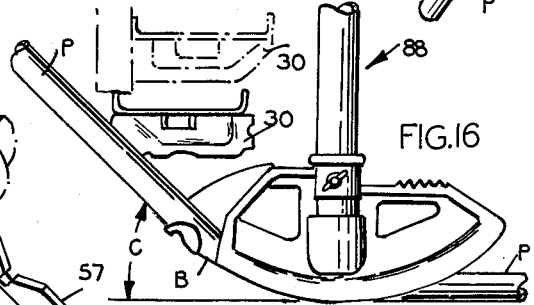
INVENTOR,
LAWRENCE N. LEA,
BY
ATTORNEY.

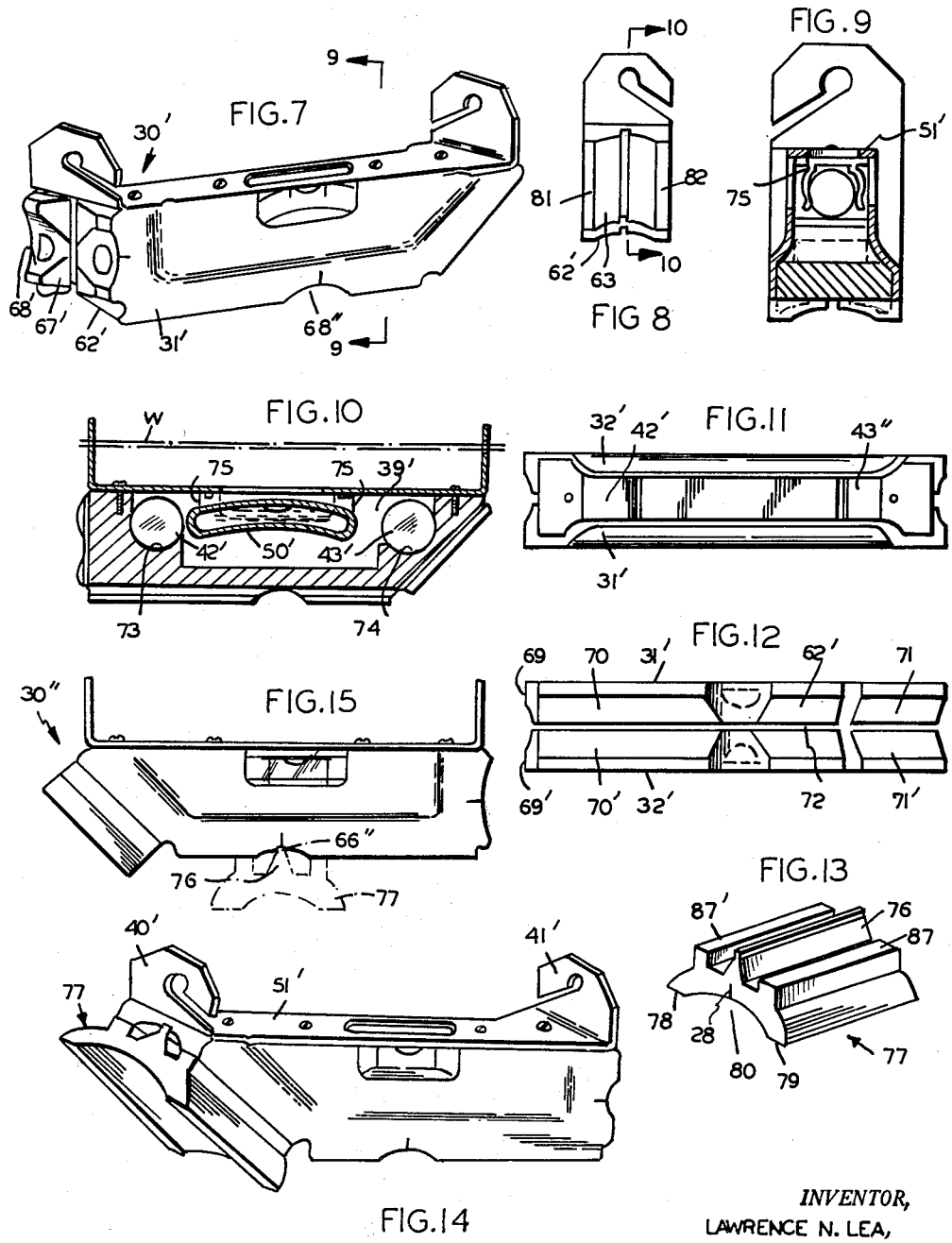

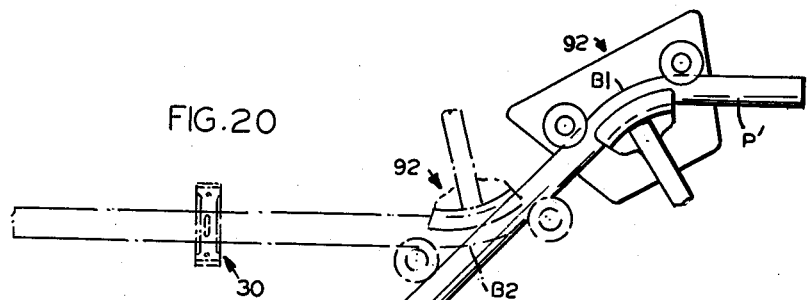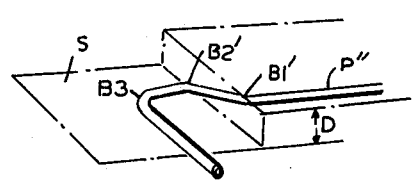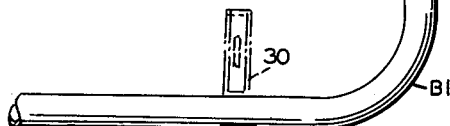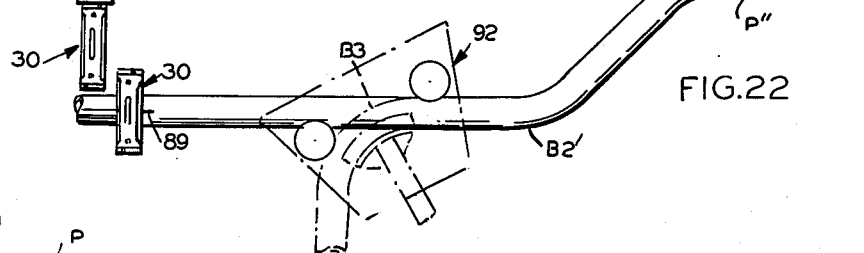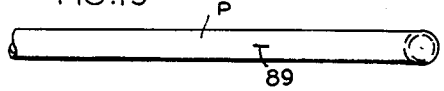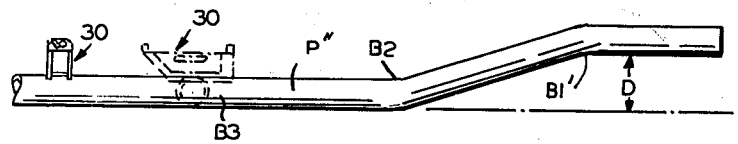

United States Patent Office 3,106,024
Patented Oct. 8, 1963

3,106,024
LEVELING DEVICES
Lawrence N. Lea, New York, N.Y., assignor to
Alan L. Oehrig, Rockville Centre, N.Y.
Filed Nov. 18, 1960, Ser. No. 70,148
13 Claims. (Cl. 33—207)

The present invention relates to spirit level devices which in addition to the usual uses to which instruments of this class are employed in making or checking installations and assemblies, are particularly adapted for use in bending operations on pipe, rod and bar stock of every description.

This application is a continuation in part of each of my two patent applications which are identified under Serial No. 20,188, filed April 5, 1960, and Serial No. 54,635, filed September 8, 1960, which have been abandoned upon the filing of this application.

An object of this invention is to provide a novel and improved leveling device of the character mentioned, which makes it simple and convenient with ordinary bending apparatus, to accomplish a multiplicity of true bends in cylindrical pipe or other elongated stock, without resorting to cumbersome equipment, protractors, scales or screw adjustment.

Another object thereof is to provide a novel and improved leveling device of the kind set forth, in which a single spirit level cartridge which is in a fixed position thereon, will indicate horizontal, vertical and sloped planes.

Still another object thereof is to provide a novel and improved leveling device having the attributes mentioned, which is simple construction, reasonable in cost to manufacture, easy to use and efficient in carrying out the purposes for which it is designed.

Other objects and advantages will become apparent as this disclosure proceeds.

For the practice of this invention, one form of this device of a size easily carried in a pocket, comprises a unitary structure of trapezoidal form, presenting permanent magnet poles along its bottom end and side ends so that when set with any of said ends on and along a cylindrical iron pipe, the article will automatically adhere to the pipe. One side end is perpendicular to the bottom end and the other side end is inclined at an angle of 135 degrees to the bottom end. Above said bottom end and between the side ends, there extends a viewable spirit level cartridge, positioned so that its bubble indicates when the bottom end of the device is horizontal. The bottom and side ends offer the incidents of a V-block, channel or other suitable structure to saddle the pipe along its length. Provision is also made so that the device can be set across the pipe on its bottom and the perpendicular side ends respectively. Appropriate graduations on the device permit the artisan to determine central pipe planes as will be explained. For use with a pipe which is not of magnetizable material, an adapter is provided to be releasably fixed onto the pipe and receive the leveling device in the required positions. Preferably, the magnet structure comprises spaced front and rear plates with an element associating them; such element being between them and spaced from the bottom and side ends of the device.

A detailed description will now be given of several embodiments of this invention and manners in which they can be used, for which reference will be had to the accompanying drawings forming part of this specification in which similar characters of reference indicate corresponding parts in all the views.

FIG. 1 is a front view of a leveling device embodying the teachings of this invention. The front plate is broken through to expose a bar magnet element positioned through a block member between the front and back plates.

FIG. 2 is a top plan view of FIG. 1.

FIG. 3 is an "exploded view" which includes the block member, magnet elements and the front plate, all shown in perspective.

FIG. 4 is an inverted perspective view of the leveling device, showing an adapter associated therewith which permits the device to be used on pipes of non-magnetizable material.

FIG. 5 is a perspective view of the adapter, drawn to an enlarged scale, the scale used for FIG. 6.

FIG. 6 is a section taken at line 6—6 in FIG. 4.

FIG. 7 is a perspective view showing another embodiment of this invention.

FIG. 8 is an end view of FIG. 7.

FIG. 9 is an enlarged section taken at line 9—9 in FIG. 7.

FIG. 10 is a section taken at line 10—10 in FIG. 8.

FIG. 11 is a top plan view of FIG. 7, but omitting several parts to attain clarity of illustration.

FIG. 12 is a bottom plan view of FIG. 7.

FIG. 13 is a perspective view of a permanent magnet element, for use with a modified embodiment of this invention.

FIG. 14, is a perspective view of such modified embodiment.

FIG. 15 is a front view of the leveling device shown in FIG. 14.

FIG. 16 is an elevational view showing how the leveling device taught herein is used for bending a pipe up 45 degrees, and in dash and dot line, for a 90 degree bend; the bending being done by a hand bending tool, commonly called a hickey.

FIG. 17 is a perspective view showing the use of the leveling device in making coplanar bends in a pipe. Here too, the bending is done by hand tool. The showing here, is the making of the second bend, or any other after the first bend has already been made in the pipe.

FIG. 18 is a top plan view of a pipe which has one bend in it, lying on a horizontal surface as for instance a floor or table. The leveling device is shown in position thereon so that the artisan can make a proper mark on the pipe, so that with the aid of the leveling device as shown in FIG. 17, the second bend will be coplanar with the first and so will all subsequent bends.

FIG. 19 is the elevational view of FIG. 18, showing the mark made on the pipe to guide bending operations after the first bend is made.

FIG. 20 is a top plan view showing the use of the leveling device while a pipe having one bend already in it, is set into a powered pipe bender to effect a subsequent bend coplanar with the first; such subsequent bend being shown in dash and dot line.

FIG. 21 is a pictorial view of a pipe provided with a right-angle bend in angular relation to a rolled offset.

FIGS. 22 and 23 are plan and elevational views respectively, of stages of bending the pipe to the form shown in FIG. 21 after the coplanar bends are in.

In the drawings, the numeral 30 designates generally a leveling device comprising the identical, opposite, parallel, spaced and substantially U-shaped flat steel plate or wall members indicated generally by the numerals 31 and 32 respectively, which are suitably secured, one onto the front and the other onto the back surface of a spacer or block member denoted generally by the numeral 33. This block, which is of non-magnetizable material, may be a plastic or aluminum molded piece with holes therethrough as indicated at 34—38, a downward open-top cavity 39 and the upwardly extending end lugs 40, 41. Through the transverse holes, 34 and 38, or through the holes 35, 37, are set high-power permanent bar magnets 42, 43, with their positive poles flush against one surface of the block 33, and their negative poles flush with the other surface of said block. Upon assembly of the plates and said block, the plate 31 will be in pressing contact against the positive magnet poles and the plate 32 will be in pressing contact against the negative poles of said bar magnets 42, 43. Suitable pins 44, extending laterally from each block face, may be provided to locate the plates when such pins are brought through the holes 45, and screws 46 hold the plates to the block, by engaging the threaded holes 47. The only magnetic path connection of the plates 31, 32, shall be through the permanent bar magnets 42, 43. Said block is within the confines of said plates, upwardly from the bottom and inwardly of the side edges of said plates, but exposed on top so that the spirit level cartridge indicated generally by the numeral 50, is viewable through the opposite cutouts 48, 49. A cover plate 51 fixed atop the block 33, has a window cut-out 52, along the spirit level cartridge 50, to expose same.

On each plate 31, 32, the angle A is 90 degrees and the angle B is 135 degrees. The bottom edges 53, 54 of said plate members determine a plane, herein referred to as the first plane. The side edges 55, 56 determine a second plane which is perpendicular to said first plane and makes a right angled dihedral angle with said first plane. The other side edges 57, 58 of the plate members determine a third plane which makes a 135 degrees dihedral angle with said first plane. The angle between said second and third planes is 45 degrees. The spirit level cartridge 50 is so fixed on the block within the cavity 39 along the direction of the bottom edges 53, 54, that when said first plane is horizontal, the bubble 60 will be centrally between the central graduation marks 59 and 61 on said cartridge. Thus it is evident that when the device 30 is set on a horizontal surface contacted by the bottom edges 53, 54, the bubble 60 will assume its position between said graduations 59, 61. hen the device 30 is set with its side edges 55, 56 against a vertical surface or with its other side edges 57, 58 against a 135 degrees incline, the bubble 60 will be between said graduations 59, 61.

Each of the plate members 31, 32, in its side and bottom edges, is provided with an obtuse-angled notch as indicated at 62, 63 and 64. The notches which are opposite each other are in alignment to provide in effect, a V-block to position the device 30 across a pipe. The sides of each notch are of equal length and of course, opposite notches are identical. At the vertex of each of said notches, on the exposed faces of said plates, there is a graduation 65 which may be a relatively narrow notch as 66, along a line perpendicular to its associated edge of the device 30. The position of said notches 62, 64 are preferably mid-way of the ends of the edges they are in. The notches 63 are preferably under the center of gravity of the device 30. When said leveling device is set onto a pipe or other cylindrical object, either along the pipe or across it, the contact the opposite plates make with such pipe, is always along two lines parallel to the longitudinal axis of such pipe. Hence when the mentioned first plane is horizontal, the bubble 60 is centered, regardless of the manner the device 30 is on the pipe. Any channel construction offering contact with the pipe along two parallel lines along the pipe when set thereon, is proper for the end and bottom structure of this device. If such channel is concave, then its radius shall not exceed the radius of pipe it is used on, in order to attain such prescribed contact.

The embodiment shown in FIG. 7 where it is indicated generally by the numeral 30', utilizes channel structure throughout as the means for locating it on a pipe in all positions thereon employed in the use of this device. This is afforded by providing the plates 31', 32' with inward flanges along its bottom and side edges; such flanges being bent to form the required channel structures indicated at 67', 62', 63', 68' and 68''. The flanges 69, 70, 71 of plate 31', do not touch the flanges 69', 70', 71' of plate 32', thereby leaving an equi-width space 72 which is continuous along the bottom and side edges of this article. Here, the end lugs 40', 41' are bent up from the ends of the cover plate 51'. The permanent magnets 42', 43' set in concave seats 73, 74, which are offered by cavity extensions of the cavity 39' which houses the spirit level cartridge 50'; the latter being mounted by the clip brackets 75 which depend from the underside of said plate 51'. A similar cover plate with the cartridge mounted thereon may be used in the device 30, in which instance, the lugs 40, 41 may be omitted from the block 33, and of course, the notch graduations 66 may be used in place of the graduation marks 65, 65' wherever such marks appear.

In the embodiment shown in FIG. 15, indicated generally as 30'', the device is that shown in FIG. 7, minus the magnets 42', 43'. Here, an adapter designated generally by the numeral 77 is used, by fitting its upward tooth 76 to snug fit in a pair of related notches as 66'' or into the space 72, depending upon how the device is to be set onto a pipe. The adapter 77 is really a permanent horseshoe magnet whose poles are indicated at 78, 79. The channel 80 may be concave as shown, or may be a V-channel to act as a V-block. The flanges may provide seats like 81 and 82 for the coplanar surfaces 87, 87'.

It is evident that magnetic action will hold the devices in all required positions on a pipe of iron or steel. When the pipe is of non-magnetizable material as brass or aluminum, an adapter 84 of magnetizable material is used to mount the leveling device on; such adapter having an adjustable pliable strap or the like, as indicated at 83, for securing it to the pipe; such adapter and its strap being turnable on the pipe as a ring thereon, to bring the leveling device carried by such adapter, to its proper position, means, where the mentioned first plane is horizontal. Adapter 84 is suited for use with the device 30. The piece 77 provided with a strap (not shown) and not magnetized, serves as an adapter to use the device 30' on nonferrous pipes. The adapter 84 has an integral square block 85 to fit between the plates 31, 32, and the laterally extending pins 86, one at each side face of block 85, locates in opposite notches like 66, to position the device 30 either along or across the pipe, as need be. Said block is of reduced dimension to slide fit between the said plates 31, 32. There are graduation marks 29 at the pins 86, and at the center plane of the piece 77, there are the marks 28.

Various manners of use of the leveling devices taught herein, will now be given, and although reference is had to device 30, those versed in the art will readily comprehend analogous uses of the other embodiments shown herein, without further explanation.

In making a 45 degrees bend-up in a pipe with the aid of the hickey 88, set the leveling device 30 with its side edges 57, 58 along the portion P' of the pipe P, so that the lines of contact are in a plane perpendicular to the plane of the bend-to-be. This may be done on the unbent pipe, or soon after a slight bend is made at B'. The mechanic can make this setting by eye. Then the bending is continued until the bubble 60 is between the marks 59 and 61. This indicates that angle C is 45 degrees. For indicating a 90 degrees bend B1, the device 30 is set onto the pipe with its side edges 55, 56, as indicated by dash and dot line in FIG. 16; said device being set on as described in relation to the plane of the bend-to-be. Bending of the pipe is continued until the bubble 60 is between the marks 59 and 61. At such event, the bend effected is 90 degrees.

To make a second bend B2 coplanar with bend B1, where the hickey 88 is to be used for bending, the pipe is laid on a horizontal surface and the device 30 is applied thereto with its side edges 55, 56 thereon as shown in FIG. 18; the adapter 84 being used here if the pipe is of non-magnetizable material. A mark 89 is written or scratched on the pipe at the notch or mark 90, and then upon removal of the device 30, the pipe is again associated with the hickey where the second bend B2 is to be made, and the device 30 is then set with its bottom edges across the pipe as in FIG. 17, with said mark 89 in register with the mark 65 and the pipe is turned with the device 30 so attached, until the bubble 60 is between the marks 59 and 61. The hickey is now tightened to the pipe and the bend B2 is made. The bends B1 and B2 will be coplanar. It is evident that when the device 30, with its bubble 60 showing horizontal, is set across the pipe as described for FIG. 17, where the mark 89 on the pipe is in register with the mark 65, the bent pipe is held in its center plane coinciding with the center plane of the hickey's bending form 91. With the device 30 so held to register horizontal, all further bends made in the pipe P will be coplanar with the first bend B1. For dogs in the pipe to the same side thereof as dog P1, use the mark 89 to get a dog as P2. For dogs in the pipe P, extending to the other side of said pipe, use a mark on said pipe diametrically opposite the mark 89, by making it with the device 30 set as shown in dash and dot lines in FIG. 18. After the pipe P has been properly set and engaged by the hickey 88, the device 30 may be removed from the pipe which is then bent.

When the bending is done by a powered pipe bender indicated at 92, which effects bends in a horizontal plane, and several coplanar bends are to be made in pipe P″, then after the first bend B1′ is made and before releasing the pipe from the bender 92, the device 30 is set across the pipe as shown in FIG. 20, so that the bubble 60 register horizontal. Now make a mark 94 on the pipe at the mark 65. The device 30 so set remains on the pipe until the latter is set in position at the second bend location and then the pipe P″ is turned until the bubble 60 indicates horizontal. Now the pipe is engaged by the bender and the bend B2′ is made. This same procedure is followed at all subsequent bends to be made which are to be coplanar with those made.

It is apparent that marks on the pipe to locate the device 30, so that different center planes are determined, will permit bends in different planes, or a plurality of bends which are coplanar, but in angular relation to one or a plurality of bends which are in another plane. As an example, to make the bend B3 shown in FIG. 21, lay the pipe on a horizontal surface S and roll the pipe portion in which the bend B3 is to be made, to a position where the desired dimension D is attained. Now set the device 30 across the said pipe portion, away from the region where the bend B3 is to be made, and move said device in a direction around the pipe until the bubble 60 registers horizontal. Now make a mark on the pipe at graduation 65. Now set the pipe into the bender 92 at region where said bend is to be made, adjust the device 30 to register horizontal when its graduation 65 is at the mark on the pipe, by moving the pipe, and then let the bender 92 secure the pipe and make the bend B3.

This leveling device is of course useable on flat surfaces and for all purposes for which spirit levels are generally employed. Of importance is that the device remains set on the work in the position it is placed thereon and leaves the hands of the worker free to make adjustments and manipulate tools as need be. For instance in hanging a cabinet of ferrous metal by securing it to a wall, the worker need fasten the cabinet with one screw, then set the leveling device of the kind taught herein, either on an intended horizontal or vertical wall of the cabinet, and shift the cabinet until the level device indicates true horizontal or vertical as the case may be. His hands being free of the level device as 30, the artisan easily completes the mounting of the cabinet.

The lugs 40, 41 have the aligned holes 99, each with a communicating entrance slot as 98 so that the device can be hung on a string or wire W which is to be set horizontal. Even if the string or wire sags or swings, the leveling device will not fall off easily, because of the bend 98′ in the entrance slot.

It is of importance to note that the leveling device uses but one spirit level cartridge, and though fixed in position thereon, serves for all readings. There are no parts which need adjustment. The device can be made small enough to be carried in a pocket, if desired it may have a clip thereon (not shown) so it may be carried like a fountain pen, and because of its small size, it is convenient for use in ordinarily inaccessible places.

It is evident that the body of a leveling device as taught herein, requires a bottom end and a side end structure, each determining a plane respectively, whereby the device is standable on each of said structures; said planes being in perpendicular relation. In specific embodiments herein illustrated, there need be a second side end structure to determine a third plane, and it is preferred that all said planes be perpendicular to a common plane, and it is most practical that the said third plane be in angular relation of 135 degrees to the bottom plane. To fit the device along and across a cylindrical object, said end structures need an inward space to receive therein at least part of said object. Indicia required may be a mark or a notch in place of such mark and such notch may be a deepened portion of a notch already in the device. When an adapter is required to mount the leveling device, then such adapter must have the incidents of structure permitting it to set onto a cylindrical object and the proper indicia which has been mentioned.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description herein to indicate the scope of this invention.

I claim:

1. In a leveling device of the character described, a permanent magnet structure comprising two opposite plates spaced apart a predetermined distance and a connecting element therebetween; each plate having a bottom edge and a side edge perpendicular to said bottom edge; the bottom edges of said plates being parallel and said side edges being opposite each other and parallel and an elongated spirit level cartridge carried fixed on said device lengthwise in a direction parallel to said bottom edges whereby when the device is set with its bottom edges on a horizontal surface, the bubble of the spirit level cartridge will be centered; said connecting element being spaced from the bottom and said side edges of the plates.

2. A leveling device as defined in claim 1, wherein the plane determined by the bottom edges and the plane determined by the said side edges of the plates, are perpendicular to a common plane.

3. A leveling device as defined in claim 1, wherein each plate has a second side edge opposite its mentioned side edge, in a predetermined angular relation with the bottom edge; such second side edges being parallel and said connecting element being spaced from said second side edges of the plates.

4. A leveling device as defined in claim 3, wherein the predetermined angular relation is 135 degrees.

5. A leveling device as defined in claim 3, wherein the plane determined by the bottom edges and the respective planes determined by corresponding parallel side edges, are all perpendicular to a common plane.

6. A leveling device as defined in claim 1, including a spacer block of non-magnetizable material between the plates and inwardly spaced a predetermined distance from said bottom and side edges of such plates; said plates carrying said spacer fixed thereto; said spacer supporting said connecting element therethrough; said element being a permanent bar magnet which is a piece separate from said plates; said plates being of magnetizable material in abutment with the magnetic poles of said element respectively.

7. A leveling device as defined in claim 6, wherein the connecting element is through a hole in the spacer having its ends at said plates respectively.

8. A leveling device as defined in claim 6, wherein each plate has a second side edge opposite its mentioned side edge, in predetermined angular relation with the bottom edge; such second side edges being parallel; said connecting element being spaced from all of said bottom and side edges of the plates and the block being inward from said second side edges a predetermined distance.

9. A leveling device as defined in claim 6, wherein the bottom edge of each plate has a notch; said notches being in alignment whereby the device can be set with its bottom edges across on a cylindrical object positioned through said notches; said device resting on said object whereby the longitudinal axes of said object and the spirit level cartridge are in perpendicular relation; said device having an exposed mark thereon on an outer face of a plate at the notch in said plate, which when the device is set as mentioned on said object and the bubble of the spirit level cartridge is centered, such mark will be in the diametral plane of said cylindrical object which is perpendicular to the plane determined by the bottom edges of the plates.

10. A leveling device as defined in claim 6, wherein the first side edge of each plate has a notch; said notches being in alignment whereby the device can be set with its first side edges across on a cylindrical object positioned through said notches; said device resting on said object whereby the longitudinal axes of said object and the spirit level cartridge are in perpendicular relation; said device having an exposed mark thereon on an outer face of a plate at a notch last mentioned in this claim, which when the device is set as mentioned on said object and the bubble of the spirit level cartridge is centered, such mark last mentioned will be in the diametral plane of said object which is parallel to the plane determined by the bottom edges of the plates.

11. A leveling device as defined in claim 10, including an adapter of magnetizable material with means to releasably mount it on and along a cylindrical object; said adapter having a relatively smaller square block slidably fitted between the plates with opposite sides thereof contacting the inner surfaces of said plates; said square block being on a larger block and within its confines; two corresponding end edges of the plates contacting said larger block, laterally extending elements on all four sides of said smaller block; a pair of opposite elements of those mentioned, being fitted in opposite notches which are in said plates; each pair of opposite elements being so fittable; the bottom surface of said larger block having an inward space where when the adapter is set onto a cylindrical object with an end of the smaller block along said object, said block edge will be parallel to the longitudinal axis of said object and an exposed mark on said larger block, which when said adapter is set on and along a cylindrical object as mentioned and carrying said device and the bubble of the spirit level cartridge is centered, such mark on the adapter will be in a diametral plane of said cylindrical object which is in a determined angular relation to the plane determined by the edges of the plates which are at said object.

12. A leveling device as defined in claim 10, including an adapter of magnetizable material with means to releasably mount it on and along a cylindrical object; said adapter having a relatively smaller square block slidably fitted between the plates with opposite sides thereof contacting the inner surfaces of said plates; said square block being on a larger block and within its confines; two corresponding end edges of the plates contacting said larger block, pins extending laterally from all four sides of said smaller block; a pair of opposite pins of said pins, being fitted in a pair of opposite deepened portions of a pair of opposite notches; each notch in the plates having a deepened portion; each pair of opposite pins of said pins being so fittable; the bottom surface of said larger block having an inward space where when the adapter is set onto a cylindrical object with an edge of said smaller block along said object, said block edge will be parallel to the longitudinal axis of said object and an exposed mark on said larger block, which when said adapter is set on and along a cylindrical object as mentioned and carrying said device and the bubble of the spirit level cartridge is centered, such mark on the adapter will be in a diametral plane of said cylindrical object which is in a determined angular relation to the plane determined by the edges of the plates which are at said object.

13. A leveling device as defined in claim 10, wherein all the end edges of the plates are bent inwardly whereby said plates are provided with flanges; there being a space of uniform width between the flanges on one plate and the corresponding flanges on the other plate whereby a straight track is formed between corresponding flanges parallel to the planes of said plates; the exposed surfaces of said flanges being bent inward whereby the device can be set with corresponding ends of the plates on and along a cylindrical object and an adapter block of magnetizable material with means to releasably mount it on and along a cylindrical object; the bottom surface of said block having an inward space therealong whereby the block is placeable on and along a cylindrical object, a central tooth formed intermediate coplanar seats extending upwardly from the upper surface of the block and lengthwise thereof; said tooth being engaged in said space between the flanges and the device resting on said seats.

References Cited in the file of this patent
UNITED STATES PATENTS

| | | |
|---|---|---|
| 706,095 | Dehrle | Aug. 5, 1902 |
| 948,523 | Perkins | Feb. 8, 1910 |
| 2,386,833 | Baldwin | Oct. 16, 1945 |
| 2,535,791 | Fluke | Dec. 26, 1950 |
| 2,770,888 | Von Duyke | Nov. 20, 1956 |
| 2,789,363 | Miley | Apr. 23, 1957 |
| 2,939,947 | Schultz | June 7, 1960 |